Sept. 5, 1967  R. E. ZIPSER ET AL  3,339,692

CONVEYOR

Filed Jan. 28, 1965  4 Sheets-Sheet 1

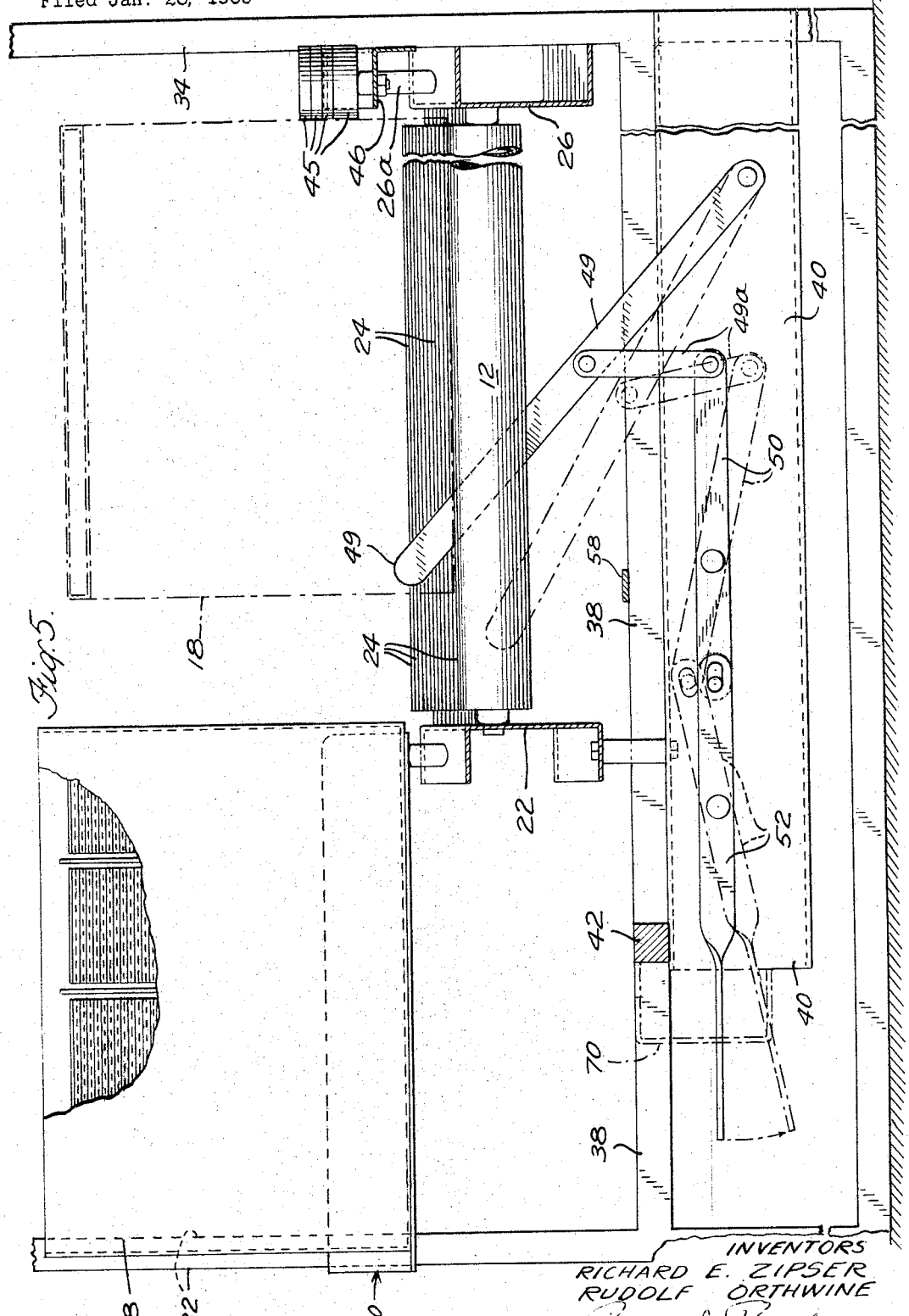

United States Patent Office 3,339,692
Patented Sept. 5, 1967

3,339,692
CONVEYOR
Richard E. Zipser and Rudolf Orthwine, New York, N.Y., assignors to Orthwine Merchandising Associates, Inc., New York, N.Y., a corporation of New York
Filed Jan. 28, 1965, Ser. No. 428,770
1 Claim. (Cl. 193—36)

This invention relates to a conveyor system and in particular to such a system which functions to move objects along paths which are non-rectilinear to a site critically located for a further feeding operation.

One object of the invention is the provision of a conveyor system having stop positions at which there are located removable barriers for the conveyed objects.

Another object of the invention is to provide a non-rectilinear conveyor system employing solely gravity feed to move the conveyed objects from one directional path to another.

In general the system comprises means to convey objects by gravity forces along separately connected paths of travel and means for transferring the objects from one path to the other without the need of employing other positive forces therefor. In addition, the system provides a work table over the conveyor device which utilizes removable barriers to position the objects critically with respect to operational devices on the table. The system provides a continuous operation and eliminates the need for lifting or dragging materials into position.

Other objects and advantages of the invention may be perceived by persons skilled in the art on reading the following detailed description of one embodiment thereof which is taken in conjunction with the accompanying drawings, in which:

FIGURE 5 is an enlarged section taken on the line 5—5 of FIGURE 1;

FIGURE 6 is a fragmentary view showing a modified form of track in the conveying system; and FIGURE 7 is a fragmentary section taken on the line 7—7 of FIGURE 6.

Figure 1:
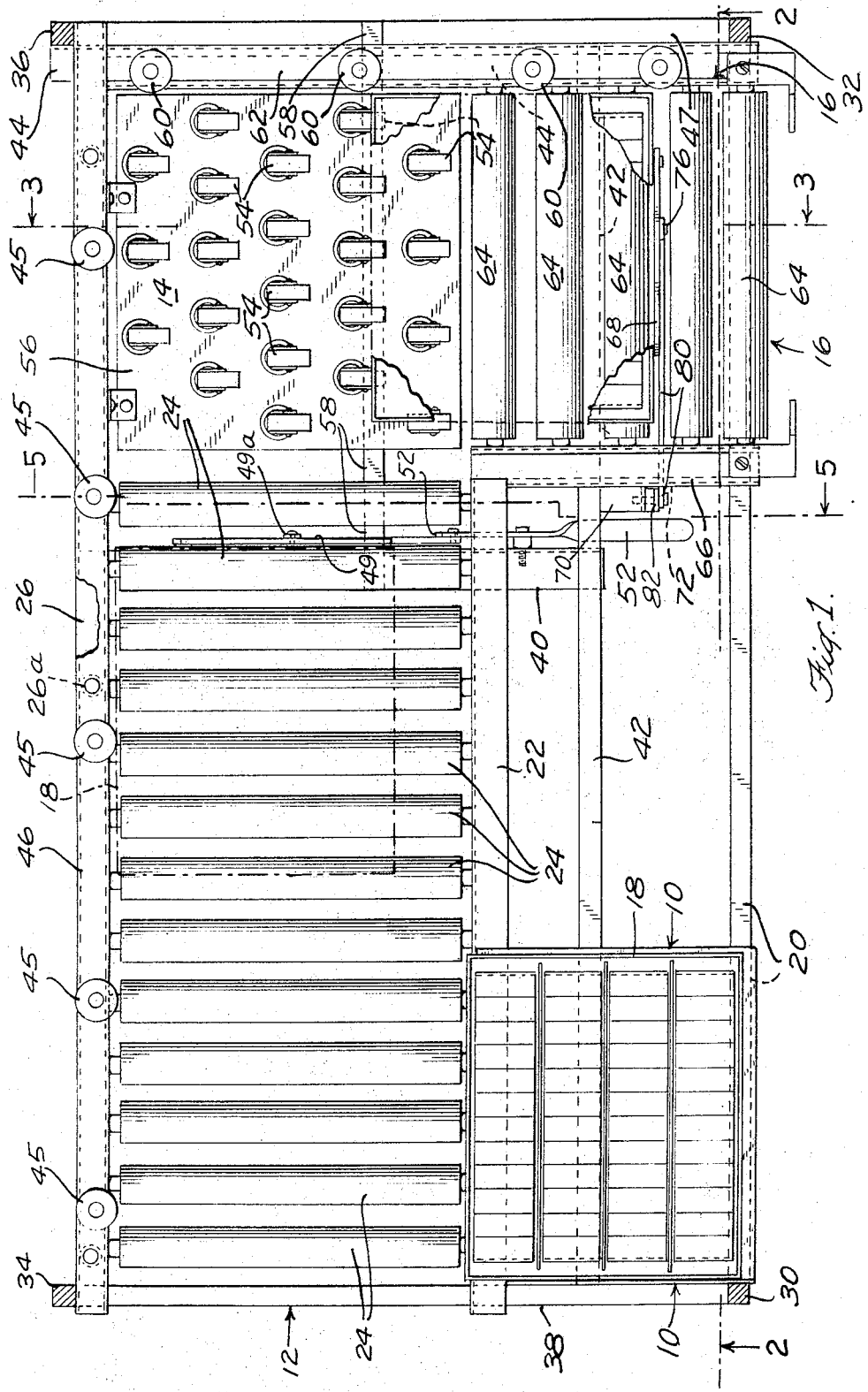
FIGURE 1 is a plan section of the carton conveying system taken on line 1—1 of FIGURE 2.
Figure 2:
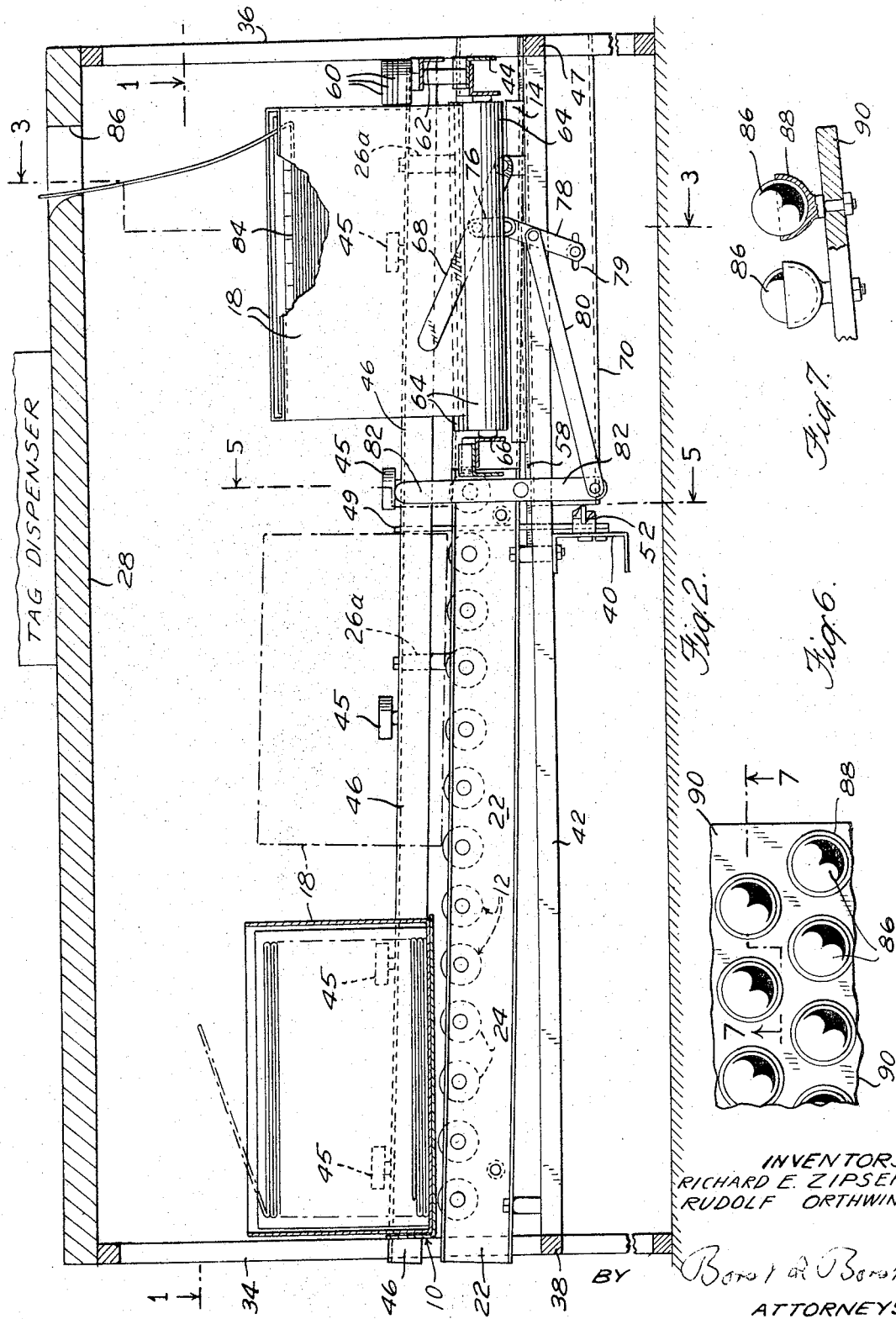
FIGURE 2 is a section taken on the line 2—2 of FIGURE 1.
Figure 3:
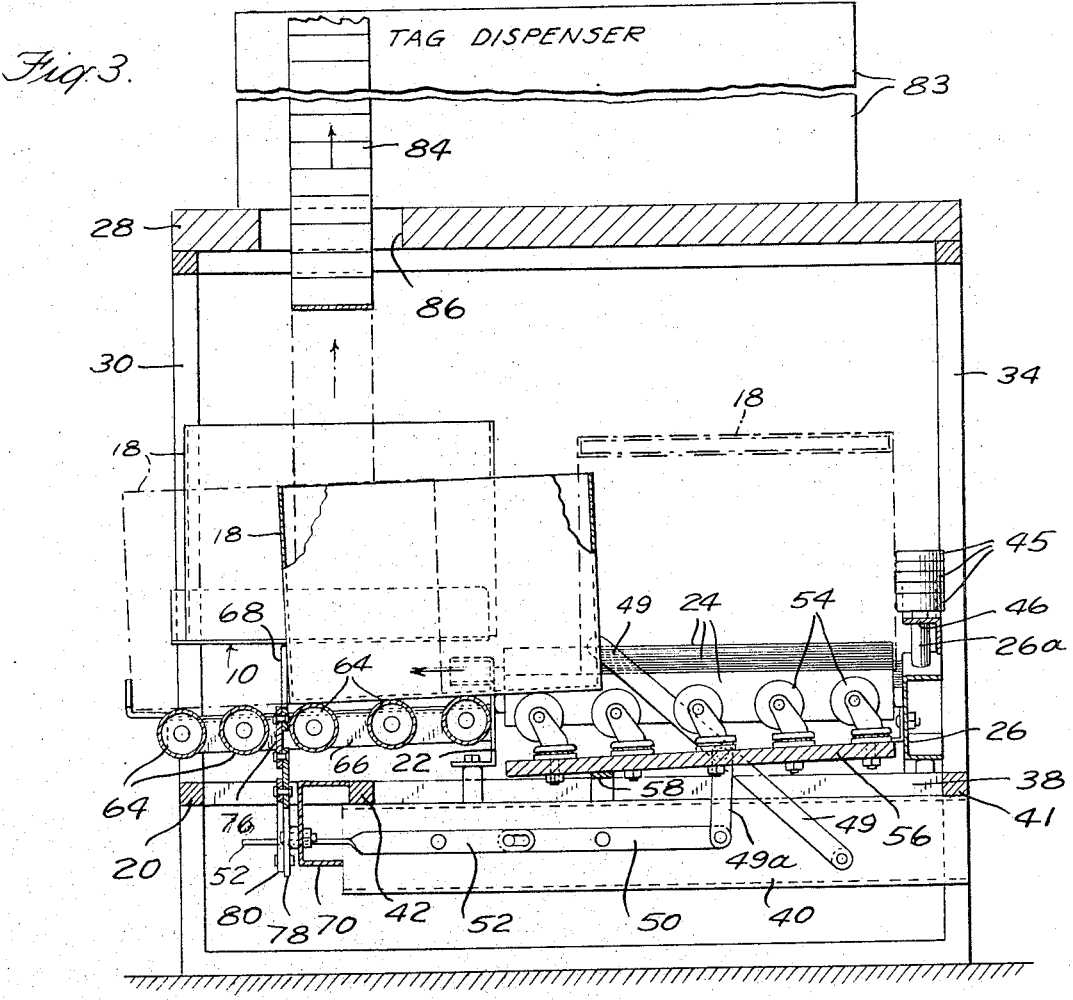
FIGURE 3 is a section taken on the line 3—3 of FIGURE 1.
Figure 4:
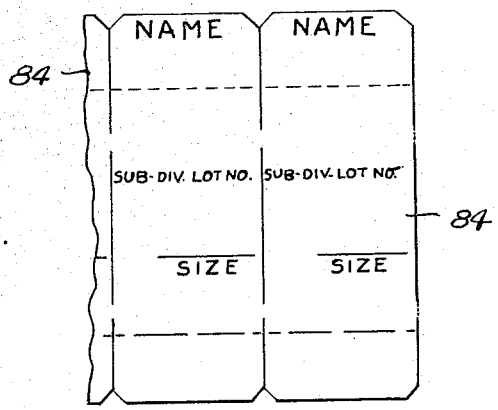
FIGURE 4 is a fragmentary view of detachable string tags adapted to be moved in cartons from one point to another by means of the conveyor system.

Referring to the drawings the conveyor system is shown to comprise a gravity conveyor employed to move objects from a platform 10 to an inclined conveyor track 12, turntable 14 and finally to a dispensing site 16 where the objects are stationed for removal from the conveyor. In particular, the present system is designed to convey cartons containing stacks of commercial string tags or labels detachably connected to each other in fanfolded sets which are disposed in their containers in condition for removal from the system by a tag dispensing device which forms no part of this invention.

As shown in the drawings a compartmented tag container 18 is placed atop the platform 10 supported on channel bars 20 and 22 from which it is removed as by hand sliding onto the gravity track 12. The latter consists of a plurality of horizontal rollers 24 journalled at one end in the channel bar 22 and at the other end in channel bar 26. The bars 20 and 26 extend between vertical stations which support work table 28 the stantions 34 and 36 supporting the bar 26. The channel bar 22 is bolted to transverse members 38 and 40, the member 38 extending between the stantions 30 and 34 and the member 40 being connected between frame member 41 and a channel beam 42 which extends the entire length of the conveyor from cross member 38 to frame member 47 connecting the stantions 32 and 36.

The rollers 24 are journalled in the channel bars 22 and 26 to descend in height successively from the platform 10 to the end of the track 12 so as to provide a gravity feed for the cartons guided in part by vertical rollers 45 supported in member 46 which extends between the stantions 34 and 36 being supported by spacers 26a on channel 26. At the end of the gravity feed track 12 is a stop 49 adapted to be positioned as a barrier for the objects at the end of the track and to be removed from their path by virtue of its rigid connection by link 49a to the end of pivotal arm 50 which has slotted pivotal connection with hand lever 52. The stop 49, the arm 50 and the hand lever 52 are pivotally connected to the cross member 40.

The turntable 14 provides a right angled turn for the objects conveyed by the gravity feed system. As the objects reach the turntable and are caused to change direction, they are pivoted by the stop 49. Essentially the turntable comprises a plurality of castors 54 mounted on plate 56 which is supported between the channel bar 26 and a member 58 extending between the cross member 40 and 47. The plate 56 inclines downwardly toward the center of the conveyor permitting the castors to provide the required gravity feed. The movement of the objects on the castors is guided by vertical rollers 60 supported by angle irons 62 on the member 44 and is established on the swiveling of the castors in the direction of the line of travel. This swiveling is automatically effected under the urging of the gravity feed.

In the dispensing site 16 there is provided a plurality of successively descending rollers 64 extending between a channel bar 66, which is connected to the structural supports 20 and 22, and the bar 44. There is disposed between the third and fourth rollers a removable stop 68 pivotable on a depending channel bar 70 which connects the beam 42 to the frame member 47 extending between the stantions 32 and 36. The stop 68 is actuated through links 76 and 78, which is pivoted in a slot 79 in the member 70, and pivotally connected link 80 and lever 82.

When conveyed to the site 16 the rollers 64 and stop 68 position the tag container 18 so that the tag dispensor 83 can draw out the string tags 84 through aperture 86 in the table 28 and feed them to a ticket imprinting machine if desired.

The gravity feed tracks or the turntable or both may employ a ball 86 and socket 88 construction, as shown in the detailed section of FIGURE 7, in lieu of the rollers and castors previously described. Each of the sockets 88 has shank portions extending through a base plate 90 to which they are secured by nuts. The balls provide minimum friction support for the cartons on the tracks and turntable and turn universally in their sockets to permit them to travel easily according to the direction of the gravity feed.

Various modifications of the invention may be effected by persons skilled in the art without departing from the scope and principals of invention as defined in the appended claim.

What is claimed is:

In a conveyor system, a pair of inclined bar members, a plurality of rollers journalled in said bar members and providing a first conveyor track, an inclined support disposed at the end of said bar members, roller means laterally and vertically disposed in said support, castors swivably journalled in said support and in inclined second conveyor track having roller elements disposed to receive objects being gravity fed from said castors and providing a feed path angularly disposed to said first conveyor track, a first removable stop located at the end of said first conveyor track, said stop being pivotally mounted beneath said track and adapted to swing from a position entirely below the track to a position in which the free end portion thereof is above the track, whereby said stop may serve both as a removable barrier and a means for turning the objects on entering said support and a second removable stop disposed at the end of said second track.

References Cited

UNITED STATES PATENTS

| | | | |
|---|---|---|---|
| 1,669,497 | 5/1928 | Steegmuller | 193—35 |
| 2,257,937 | 10/1941 | Brunnhoelzl | 193—36 |
| 2,396,090 | 3/1946 | Curtis | 193—35 |
| 2,487,878 | 11/1949 | Kantenwein | 193—36 |
| 2,875,907 | 3/1959 | Locke et al. | 193—35 |

EVON C. BLUNK, *Primary Examiner.*

ANDRES H. NIELSEN, *Examiner.*